United States Patent
Huang et al.

(10) Patent No.: US 10,066,878 B2
(45) Date of Patent: Sep. 4, 2018

(54) HEAT EXCHANGER INTEGRATED ASSEMBLY AND MANUFACTURING METHOD THEREOF

(71) Applicant: Hangzhou Sanhua Research Institute Co., Ltd., Hangzhou, Zhejiang (CN)

(72) Inventors: Linjie Huang, Hangzhou (CN); Xiaodong Zhou, Hangzhou (CN); Kai Cui, Hangzhou (CN)

(73) Assignee: Zhejiang Sanhua Automotive Components Co., Ltd., Hangzhou, Zhejiang (CN)

( * ) Notice: Subject to any disclaimer, the term of this patent is extended or adjusted under 35 U.S.C. 154(b) by 473 days.

(21) Appl. No.: 14/428,951

(22) PCT Filed: Aug. 30, 2013

(86) PCT No.: PCT/CN2013/082646
§ 371 (c)(1),
(2) Date: Mar. 17, 2015

(87) PCT Pub. No.: WO2014/048219
PCT Pub. Date: Apr. 3, 2014

(65) Prior Publication Data
US 2015/0276328 A1    Oct. 1, 2015

(30) Foreign Application Priority Data

Sep. 29, 2012  (CN) .......................... 2012 1 0369297
Jul. 19, 2013  (CN) .......................... 2013 1 0310012

(51) Int. Cl.
*F28F 9/007* (2006.01)
*F28F 1/10* (2006.01)
(Continued)

(52) U.S. Cl.
CPC ................ *F28F 1/10* (2013.01); *B23P 15/26* (2013.01); *B60H 1/00342* (2013.01);
(Continued)

(58) Field of Classification Search
CPC ..... F01P 11/08; B60H 1/00278; F28F 9/0246; F28F 9/0248; F28F 9/0251; F28F 9/0253; F28F 9/0256; F28F 9/0258
(Continued)

(56) References Cited

U.S. PATENT DOCUMENTS 4,589,265 A    5/1986 Nowawa
6,196,306 B1 *  3/2001 Aikawa et al. ....... F28D 1/0333
                                                    165/153
(Continued)

FOREIGN PATENT DOCUMENTS

CN    1195102 A    10/1998
CN    201093807 Y   7/2008
(Continued)

OTHER PUBLICATIONS

Office Action for Chinese Application No. 201210369297.X, dated Jun. 2, 2016.
(Continued)

*Primary Examiner* — Allen Flanigan
(74) *Attorney, Agent, or Firm* — Wolf, Greenfield & Sacks, P.C.

(57) ABSTRACT

A heat exchanger integrated assembly and a manufacturing method thereof are provided. The heat exchanger integrated assembly includes a heat exchanger, a mating portion and an adaptor, wherein the heat exchanger includes a first inlet and a first outlet; the mating portion includes a first side, a second side and a first hole and a second hole passing through the first side and the second side, and the mating portion further includes a first recessed portion formed on
(Continued)

the first side and in communication with the first hole; and the adaptor includes a first passage in communication with the first hole and in communication with the first inlet via the first recessed portion, and a second passage in communication with the first outlet via the second hole. The heat exchanger is integrated with other parts and is connected to an expansion valve directly.

11 Claims, 12 Drawing Sheets

(51) Int. Cl.
| | |
|---|---|
| *F25B 40/00* | (2006.01) |
| *F28F 9/02* | (2006.01) |
| *B60H 1/00* | (2006.01) |
| *B23P 15/26* | (2006.01) |
| *B60K 11/04* | (2006.01) |
| *F28F 27/02* | (2006.01) |
| *F28D 9/00* | (2006.01) |
| *B60K 11/02* | (2006.01) |
| *B60K 1/00* | (2006.01) |

(52) U.S. Cl.
CPC .......... *B60H 1/00485* (2013.01); *B60K 11/04* (2013.01); *F25B 40/00* (2013.01); *F28F 9/0075* (2013.01); *F28F 9/0253* (2013.01); *B60K 11/02* (2013.01); *B60K 2001/005* (2013.01); *F25B 2341/0683* (2013.01); *F25B 2500/18* (2013.01); *F28D 9/005* (2013.01); *F28F 27/02* (2013.01); *F28F 2280/06* (2013.01); *Y10T 29/4935* (2015.01)

(58) Field of Classification Search
USPC .......................................... 165/47, 178, 916
See application file for complete search history.

(56) References Cited

U.S. PATENT DOCUMENTS

| | | | | |
|---|---|---|---|---|
| 6,220,343 | B1* | 4/2001 | Ichiyanagi | ............ F28D 1/0341 |
| | | | | 165/153 |
| 8,186,719 | B2* | 5/2012 | Kume | .................. F28D 1/0341 |
| | | | | 165/176 |
| 2005/0126770 | A1 | 6/2005 | Higashiyama | |
| 2007/0084809 | A1* | 4/2007 | Bradu et al. | ............ F28D 9/005 |
| | | | | 211/59.4 |
| 2009/0266634 | A1 | 10/2009 | Obayashi et al. | |
| 2010/0243200 | A1* | 9/2010 | Baker, Jr. et al. | .......................... |
| | | | | B60H 1/00342 |
| | | | | 165/41 |

FOREIGN PATENT DOCUMENTS

| | | |
|---|---|---|
| CN | 101317069 A | 12/2008 |
| DE | 19814051 A1 | 10/1998 |
| DE | 102010055613 A1 | 6/2012 |
| EP | 1382920 A2 | 1/2004 |
| JP | 10267464 A | 10/1998 |
| JP | 2000179990 A | 6/2000 |
| JP | 2005029042 A2 | 2/2005 |
| WO | WO 2005012821 A1 * | 2/2005 .............. F01P 11/08 |

OTHER PUBLICATIONS

Office Action for German Application No. 112013004804.3, dated Oct. 14, 2016.
CN 201210369297.X, dated Jun. 2, 2016, Chinese Office Action.
DE 112013004804.3, dated Oct. 14, 2016, German Office Action.

* cited by examiner

HEAT EXCHANGER INTEGRATED ASSEMBLY AND MANUFACTURING METHOD THEREOF

This application is the national phase of International Application No. PCT/CN2013/082646, filed on Aug. 30, 2013, which claims the benefit of priority to Chinese Patent Application No. 201210369297.X titled "HEAT EXCHANGER INTEGRATED ASSEMBLY AND MANUFACTURING METHOD THEREOF", filed with the Chinese State Intellectual Property Office on Sep. 29, 2012, and Chinese Patent Application No. 201310310012.X titled "HEAT EXCHANGER INTEGRATED ASSEMBLY", filed with the Chinese State Intellectual Property Office on Jul. 19, 2013, which applications are incorporated herein by reference to the maximum extent allowable by law.

TECHNICAL FIELD

The present application relates to a heat exchanger integrated assembly and a manufacturing method thereof, which may be applied in a battery cooling system of an electric automobile.

BACKGROUND

An electric automobile is a vehicle using batteries as power source. Since the electric automobile has a smaller adverse effect on the environment than traditional automobiles, the electric automobile is the development trend of future automobiles as the requirements for energy conservation and emission reduction for automobiles continuously increases.

The batteries of the electric automobile generate heat during operation, which increases the temperature of the batteries, and the longer the batteries operate, and the more heat the batteries accumulate, thus the temperature of the batteries gets higher. If the batteries are not cooled in time, the working performance and service life of batteries will be adversely influenced. In the conventional technology, batteries of the electric automobile are generally cooled by a battery cooling system, the cooling capacity of which is generally provided by an air conditioning system of the electric automobile.

In general, the battery cooling system includes a plate heat exchanger and a thermal expansion valve. The plate heat exchanger substantially has two kinds of structures, one kind is formed by stacking a series of heat exchanging plates with certain corrugations, and the other kind employs fin structures between heat exchanging plates as flow passages. Both structures may form a passage for an interaction between the two kinds of media to realize heat exchange between the two kinds of media. When the plate heat exchanger is applied in the battery cooling system, two kinds of media in the passage are a refrigerant and a cooling liquid. The principle of the battery cooling system is described as follows, after flowing out of a thermal expansion valve, the refrigerant cools the cooling liquid via the plate heat exchanger, and then the cooling liquid cools the batteries via a battery cooling plate.

Reference is made to FIG. 1. The connection between a conventional plate heat exchanger 1' and a thermal expansion valve 2' is realized by leading out connecting pipes 3' at a refrigerant inlet and a refrigerant outlet of the plate heat exchanger 1' to connect to the thermal expansion valve 2'. However, this indirect connection has the following disadvantages.

1. Since the plate heat exchanger 1' and the thermal expansion valve 2' has a complicated connection structure, the assembly has a large volume, and is inconvenient to be installed inside the automobile.

2. The plate heat exchanger 1' and the thermal expansion valve 2' are connected by pipelines, thus there are many parts, and the cost is relatively high.

3. Connection pipelines between the plate heat exchanger 1' and the thermal expansion valve 2' are long, thus the whole assembly has a poor vibration-proof performance, and ruptures of the connection pipe and other phenomena are apt to occur.

4. As pipelines and other materials are added, the whole assembly has a heavy weight.

5. The refrigerant needs to pass through the pipelines to flow from the thermal expansion valve to the plate heat exchanger, which is bound to adversely affect the refrigeration effect.

Therefore, an urgent technical issue to be addressed by the person skilled in the art is to integrate a heat exchanger with other parts, to enable the heat exchanger to be directly connected to the expansion valve, so as to enable the heat exchanger to have a compact structure, a good vibration-proof performance, a low cost and be easy to install.

SUMMARY

An object of the present application is to provide a heat exchanger integrated assembly with a simple structure and a reliable performance, and a manufacturing method thereof.

For realizing the above object, the following technical solutions are provided according to the present application. A heat exchanger integrated assembly includes a heat exchanger, a mating portion abutting against the heat exchanger, and an adaptor fixed on the mating portion, wherein the mating portion is located between the heat exchanger and the adaptor, the heat exchanger includes a first flow passage and a second flow passage, and the first flow passage includes a first inlet and a first outlet; the mating portion includes a first side facing the heat exchanger, a second side facing the adaptor, and a first hole and a second hole both running through the first side and the second side, and the first hole and the second hole of the mating portion are separated from each other, and the mating portion further includes a first recessed portion formed on the first side and in communication with the first hole; the adaptor includes a first passage and a second passage, the first passage is in communication with the first hole and is further in communication with the first inlet via the first recessed portion; and the second passage is in communication with the first outlet via the second hole.

As a further improved technical solution of the present application, the first passage is aligned with the first hole, the second passage is aligned with the second hole, and a center distance of the first inlet and the first outlet is greater than a center distance of the first passage and the second passage.

As a further improved technical solution of the present application, the mating portion includes a second recessed portion formed on the first side, and a first protruding portion and a second protruding portion both being formed on the second side and protruding out of the second side, the first protruding portion is corresponding to the first recessed portion, the second protruding portion is corresponding to the second recessed portion, the first hole is located in the first protruding portion, the second hole is located in the second protruding portion and in communication with the second recessed portion, and the second passage is in communication with the first outlet via the second hole and the second recessed portion; and on the first side of the mating portion, a periphery of the first recessed portion and a periphery of the second recessed portion are both welded to the heat exchanger to form an enclosed space.

As a further improved technical solution of the present application, the first side and the second side are both a plane, the first hole and the second hole directly run through the first side and the second side, and the first recessed portion is recessed towards the second side but doesn't run through the second side.

As a further improved technical solution of the present application, the adaptor includes a main body portion, a first pipeline and a second pipeline each being located at one side of the main body portion and protruding out of the main body portion, and a third pipeline and a fourth pipeline each being located at another side of the main body portion and protruding out of the main body portion, the first pipeline is in communication with the fourth pipeline via the first passage, the second pipeline is in communication with the third pipeline via the second passage, the first pipeline is inserted into the first hole, and the second pipeline is inserted into the second hole.

As a further improved technical solution of the present application, a diameter of the first pipeline is smaller than a diameter of the fourth pipeline, and a diameter of the second pipeline is smaller than a diameter of the third pipeline; and the heat exchanger integrated assembly further includes an expansion valve, the expansion valve is provided with an inlet and an outlet, the third pipeline is inserted into the outlet of the expansion valve and the fourth pipeline is inserted into the inlet of the expansion valve.

As a further improved technical solution of the present application, the heat exchanger integrated assembly includes a mounting bracket, the mating portion is located on the mounting bracket, the mounting bracket further includes a mounting portion forming an included angle with respect to the mating portion, and the mounting bracket is provided with at least one mounting hole, and in a mounting direction passing through the mounting hole, the mounting hole is completely exposed outside the heat exchanger.

As a further improved technical solution of the present application, the mounting portion includes at least two mounting plates and these mounting plates are respectively located at two sides of the mating portion, and each mounting plate is provided with one of the mounting holes.

As a further improved technical solution of the present application, the mounting plate includes a first mounting plate, a second mounting plate and a third mounting plate, the third mounting plate is located between the first mounting plate and the second mounting plate, the first mounting plate and the second mounting plate are located at the same side of the mating portion, and the third mounting plate is located on another side of the mating portion.

As a further improved technical solution of the present application, the mounting plates are located in the same plane and are substantially perpendicular to a plane where the mating portion is located, and the mounting plates are respectively formed by bending a plurality of parts formed by cutting the same sheet plate.

As a further improved technical solution of the present application, the first mounting plate includes a first extension section, a second extension section inclined at an angle with respect to the first extension section, and a third extension section inclined at an angle with respect to the second extension section, an inclination angle of the third extension section is greater than an inclination angle of the second extension section, and the second extension section and the third extension section are inclined in a direction toward the second mounting plate.

As a further improved technical solution of the present application, the first mounting plate, the second mounting plate and the third mounting plate are each provided with a continuous strengthening rib, and the strengthening rib has one end close to the corresponding mounting hole, and another end located at a connection portion where the mounting plate intersects with the mating portion.

As a further improved technical solution of the present application, a first groove is provided between the first mounting plate and the third mounting plate, a second groove is provided between the second mounting plate and the third mounting plate, and the first groove and the second groove are recessed towards into the mating portion.

For realizing the above object, a manufacturing method of the heat exchanger integrated assembly is further provided according to the present application, and the manufacturing method includes the following steps.

S1) providing a heat exchanger, a mating portion and an adaptor, and locating the mating portion between the heat exchanger and the adaptor to directly assemble the three components;

S2) providing a clamp, and tightly pressing and fixing the heat exchanger and the mating portion by the clamp; and S3) placing the heat exchanger, the mating portion and the adaptor into a furnace to weld the three components to form the above heat exchanger integrated assembly.

As a further improved technical solution of the present application, in Step S2), the clamp is configured to clamp the heat exchanger and the mating portion; and in Step S3), a vacuum furnace is provided to perform vacuum brazing or a tunnel furnace is provided to perform nitrogen protective welding.

Compared with the conventional technology, the heat exchanger, the mating portion and the adaptor are directly integrated according to the present application without connection pipes, thus the heat exchanger integrated assembly has a simple structure and a reliable performance.

DETAILED DESCRIPTION

Figure 1:
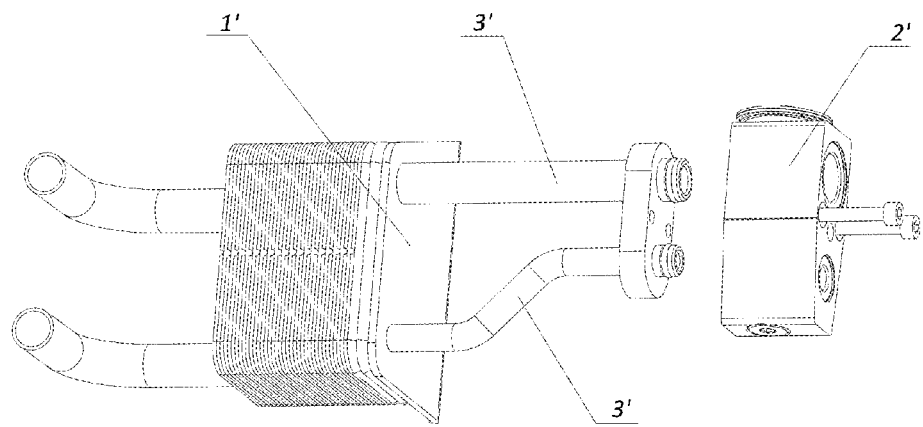
FIG. 1 is a schematic view showing a heat exchanger and an expansion valve which are connected through connection pipes in the conventional technology.
Figure 2:
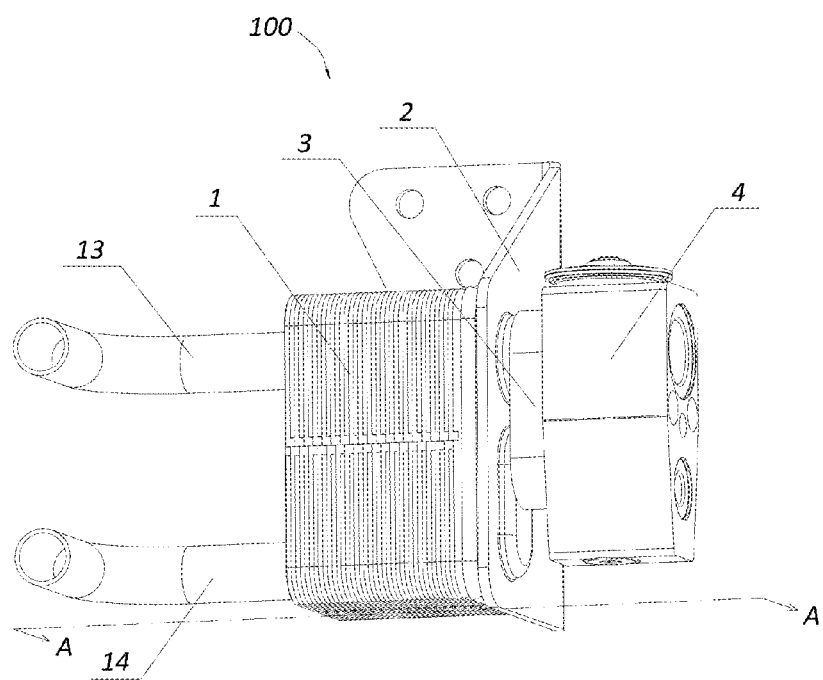
FIG. 2 is a perspective view showing a heat exchanger integrated assembly of the present application.

Referring to FIGS. 2 to 7, a heat exchanger integrated assembly 100 is provided according to the present application, which includes a heat exchanger 1, a mounting bracket 2 configured to mount the heat exchanger integrated assembly 100 onto other devices, an adaptor 3 fixed on the mounting bracket 2, and an expansion valve 4 which is mounted on the adaptor 3. The expansion valve is detachably mounted on the heat exchanger integrated assembly 100 to facilitate replacement.

Figure 3:
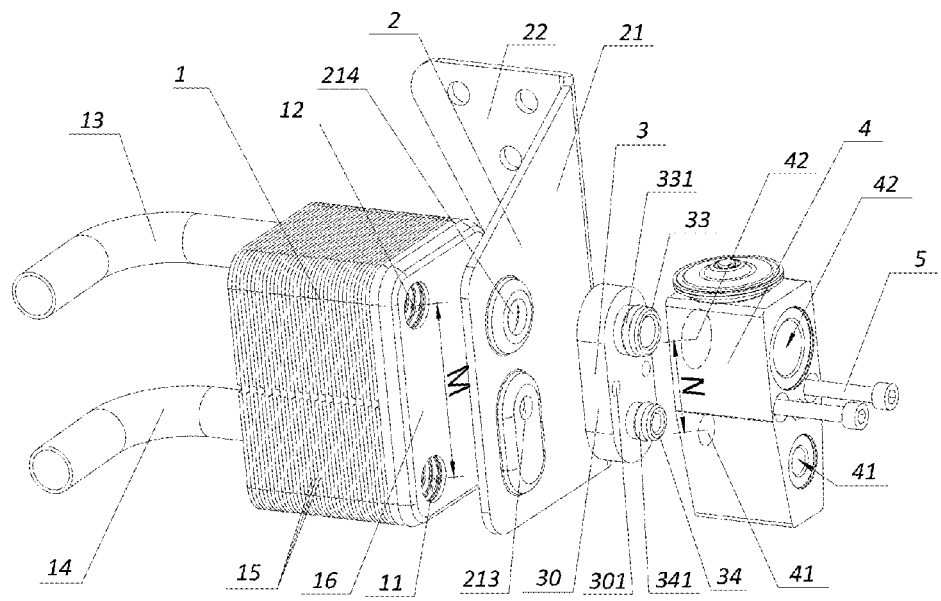
FIG. 3 is a perspective exploded view of the heat exchanger integrated assembly in FIG. 2.

Referring to FIG. 3, the heat exchanger 1 includes a first flow passage (which is a refrigerant flow passage in embodiments in the figures of the present application) and a second flow passage (which is a cooling liquid flow passage in embodiments in the figures of the present application). The first flow passage includes a first inlet 11 and a first outlet 12, and the second flow passage includes a second inlet (not shown in the figures) and a second outlet (not shown in the figures). The second inlet is connected to a first aluminous connecting pipe 13, and the second outlet is connected to a second aluminous connecting pipe 14. The heat exchanger 1 further includes a plurality of circulating plates 15 which are stacked, fins (not shown in the figures) located inside each of the circulating plates 15 and a cover plate 16 located at one side of the circulating plates (which is the rightmost side in the embodiment of FIG. 3). The first inlet 11 and the first outlet 12 of the first flow passage, and the second inlet and the second outlet of the second flow passage may be arranged on the same side or different sides of the heat exchanger 1, and can be any two of the four ports.

In the embodiments shown in the figures of the present application, the heat exchanger 1 is a finned plate heat exchanger. The heat exchanger is not the key point of the present application, therefore other types of heat exchangers are also applicable herein.

Figure 4:
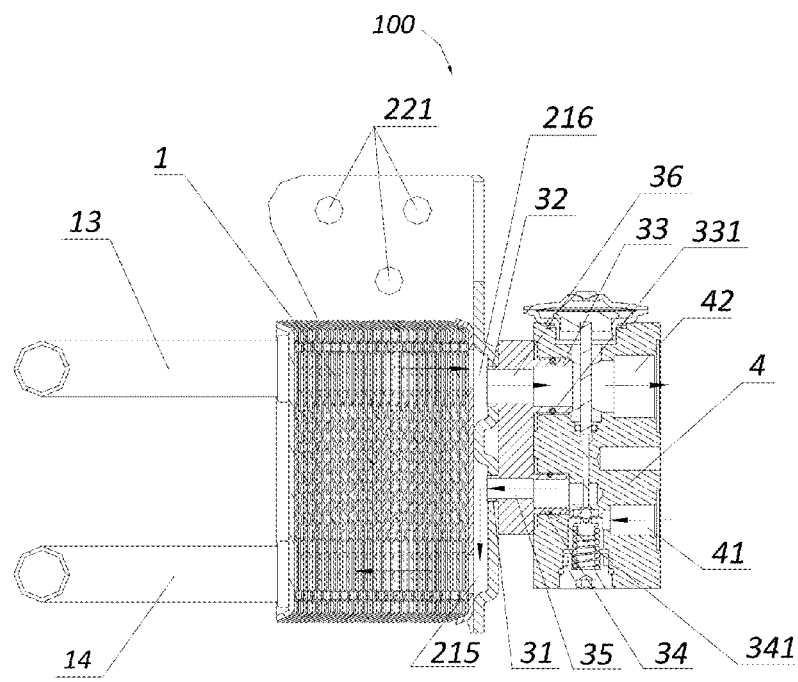
FIG. 4 is a sectional view taken along the line A-A in FIG. 2.

Referring to FIGS. 3 and 4, the adaptor 3 includes a main body portion 30, a first pipeline 31 and a second pipeline 32 both being located on one side of the main body portion 30 (which is the left side in the embodiment in FIG. 4) and protruding out of the main body portion 30, and a third pipeline 33 and a fourth pipeline 34 both being located on another side of the main body portion 30 (which is the right side in the embodiment shown in FIG. 4) and protruding out of the main body portion 30. The adaptor 3 further includes a first passage 35 and a second passage 36, both of which run through the main body portion 30. The first pipeline 31 is in communication with the fourth pipeline 34 through the first passage 35, and the first pipeline 31 has a diameter smaller than a diameter of the fourth pipeline 34. The second pipeline 32 is in communication with the third pipeline 33 through the second passage 36, and the second pipeline 32 has a diameter smaller than a diameter of the third pipeline 33. Besides, the main body portion 30 is further provided with a plurality of threaded holes 301 with internal threads, and the threaded holes 301 are configured to fix the expansion valve 4.

Referring to FIG. 3, the expansion valve 4 (which is embodied as a thermal expansion valve in the embodiments shown in the figures of the present application) includes an inlet 41 and an outlet 42. In the heat exchanger integrated assembly 100 of the present application, a bolt 5 is employed to pass through the expansion valve 4, and to be screwed into the threaded holes 301, thereby fixing the expansion valve 4 to the adaptor 3. Of course, the expansion valve 4 and the adaptor 3 may also be formed as an integrated structure, which can be realized by reserving a portion for machining the adaptor 3 on one side of the valve body of the expansion valve 4 when machining the valve body of the expansion valve 4. Other structures of the expansion valve 4, such as a temperature sensing bulb and a valve needle, are conventional technologies in the field and have no essential connections with the innovation points of the present application, thus will not be described herein. In the embodiments shown in the figures of the present application, the expansion valve 4 and the adaptor 3 are separately arranged, which, on one hand, facilitates disassembly and assembly, and replacing the expansion valve 4 at any time, and, on the other hand, has no special requirements for the structure of the expansion valve 4 and is applicable to the conventional expansion valves, thereby reducing the cost.

Referring to FIGS. 2 to 7, the mounting bracket 2 is an integrated structure that is formed by punching and bending a sheet metal. The mounting bracket 2 includes a mating portion 21, and a mounting portion 22 that is bent at a certain angle with respect to the mating portion 21. The mating portion 21 abuts against the cover plate 16 of the heat exchanger 1. The mating portion 21 and the cover plate 16 are arranged very close to each other and are in contact with each other. Eventually, the mating portion 21 and the cover plate 16 are fixed by welding.

Referring to FIG. 4, the mounting portion 22 is provided with a plurality of mounting holes 221, and the mounting holes 221 are completely exposed outside the heat exchanger 1 in a mounting direction passing through the mounting holes 221. With such arrangement, when the bolts are fitted through the mounting holes 221 to mount and fix the heat exchanger integrated assembly 100, the bolts will not bump the heat exchanger 1. This design reduces the difficulty in mounting the heat exchanger integrated assembly 100, and also greatly reduces the probability of damage to the heat exchanger 1 in mounting. Besides, for pre-positioning the heat exchanger 1 with respect to the mounting bracket 2, the mounting bracket 2 is provided with a plurality of protrusions 23, and correspondingly, the heat exchanger 1 is provided with grooves (not shown in the figure) to cooperate with the protrusions 23.

The mating portion 21 includes a first side 211 facing the heat exchanger 1, a second side 212 facing to the adaptor 3, and a first hole 213 and a second hole 214 each running through the first side 211 and the second side 212. The first hole 213 and the second hole 214 of the mating portion 21 are separated from each other. The mating portion 21 further includes a first recessed portion 215 which is formed on the first side 211 and in communication with the first hole 213. In an embodiment shown in the figures of the present application, the protrusions 23 are arranged on the first side 211 of the mating portion 21 and protrude out of the first side 211. Preferably, the protrusions 23 are close to the first hole 213 and the second hole 214, to realize a better pre-positioning effect.

Figure 5:
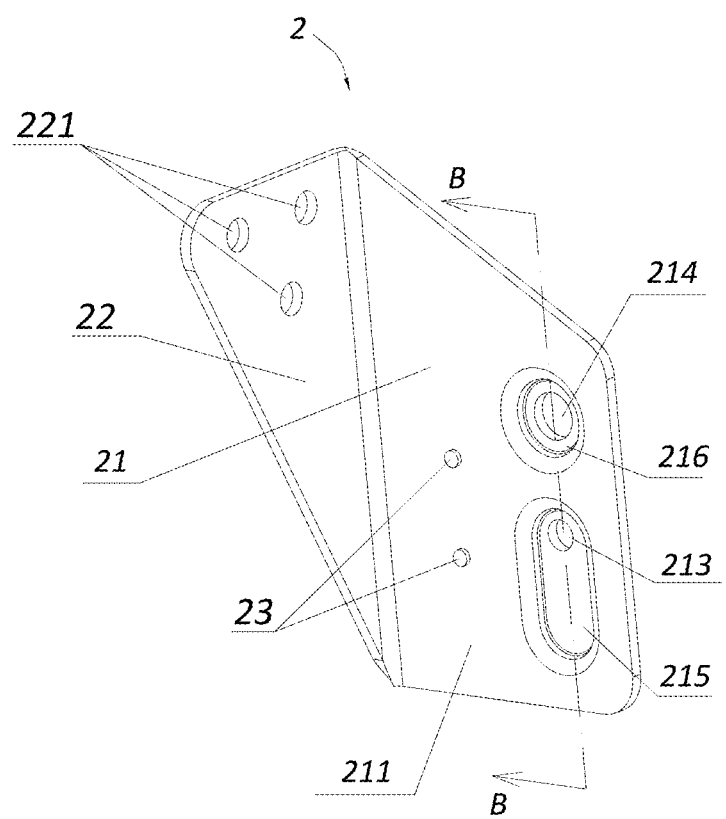
FIG. 5 is a perspective view showing a first embodiment of a mounting bracket in FIG. 2.
Figure 6:
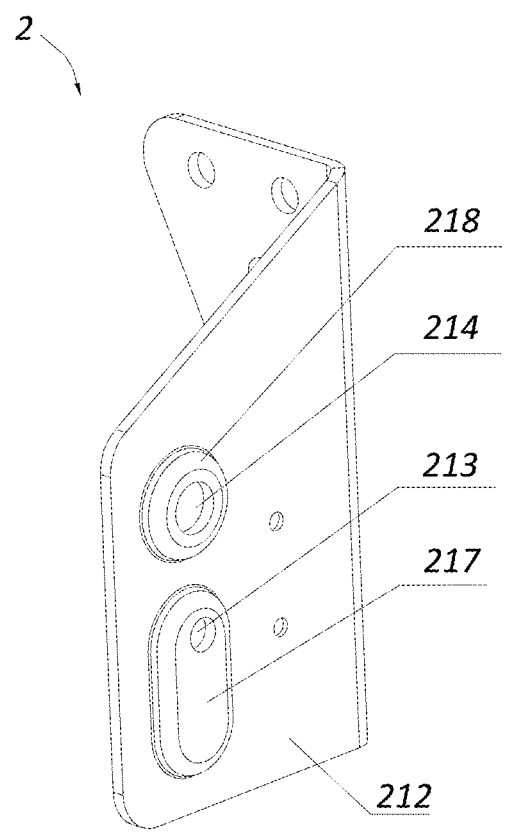
FIG. 6 is a perspective view showing the mounting bracket in FIG. 5 viewed from another angle.
Figure 7:
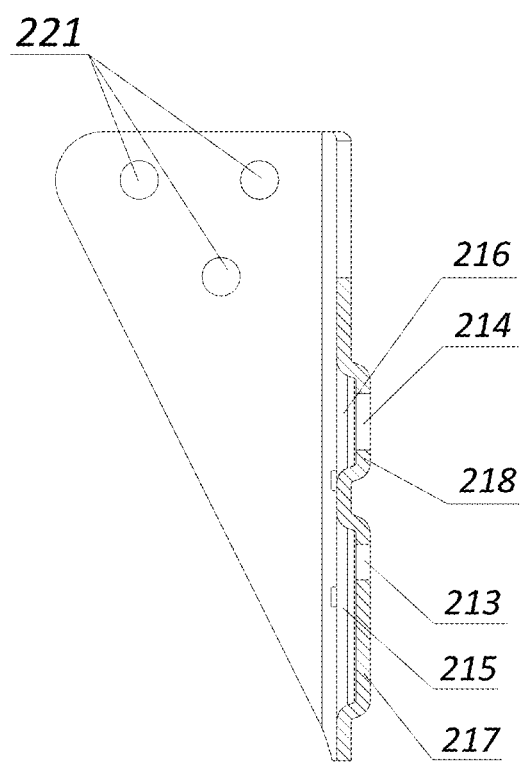
FIG. 7 is a sectional view taken along the line B-B in FIG. 5.

Referring to FIGS. 5 to 7, in a first embodiment of the mounting bracket 2, the mating portion 21 further includes a second recessed portion 216 formed on the first side 211 and separated from the first recessed portion 215, and a first protruding portion 217 and a second protruding portion 218 each being formed on the second side 212 and protruding out of the second side 212. The first protruding portion 217 is corresponding to the first recessed portion 215, that is, the first protruding portion 217 is formed while the first recessed portion 215 is formed by punching. The second protruding portion 218 is corresponding to the second recessed portion 216, that is, the second protruding portion 218 is formed while the second recessed portion 216 is formed by punching. The first hole 213 is located in the first protruding portion 217, and the second hole 214 is located in the second protruding portion 218 and in communication with the second recessed portion 216. The first recessed portion 215 may be elliptic, and the second recessed portion 216 may be circular.

Figure 8:
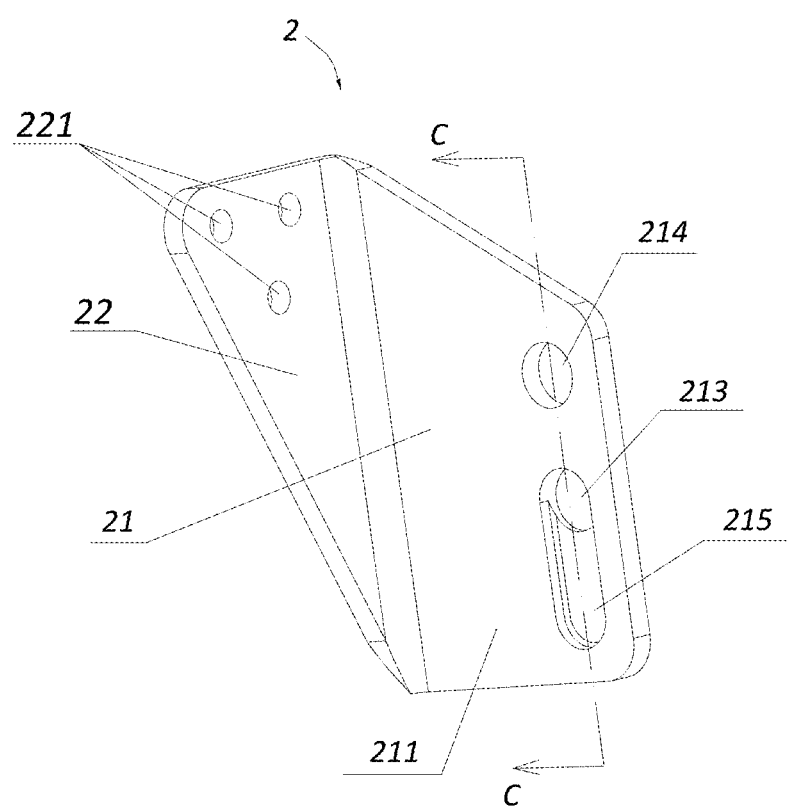
FIG. 8 is a perspective view showing a second embodiment of the mounting bracket in FIG. 2.
Figure 9:
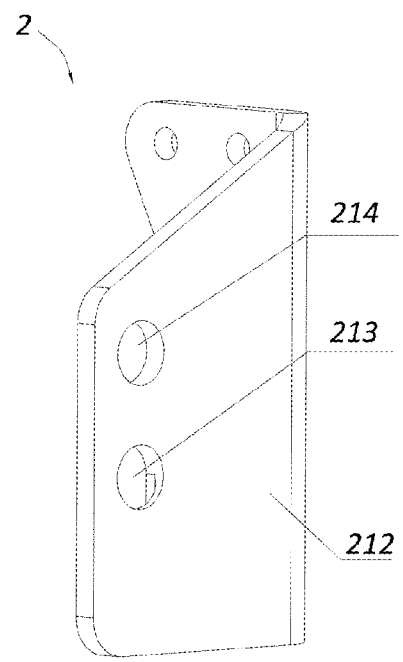
FIG. 9 is a perspective view showing the mounting bracket in FIG. 8 viewed from another angle.
Figure 10:
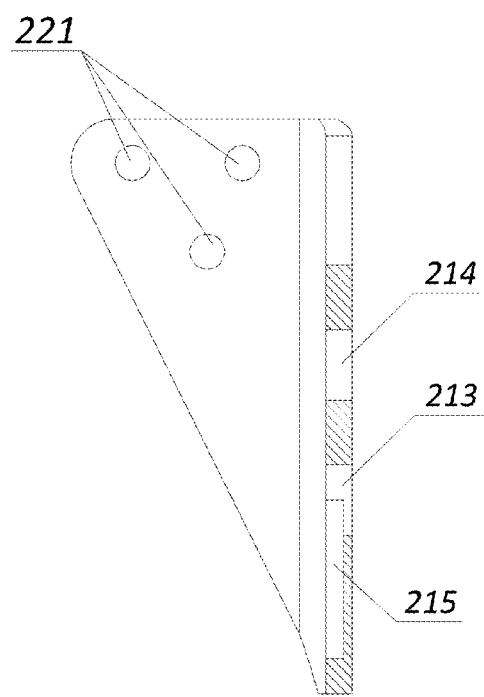
FIG. 10 is a sectional view taken along the line C-C in FIG. 8.

Referring to FIGS. 8 to 10, in a second embodiment of the mounting bracket 2, the first side 211 and the second side 212 are both a plane, the first hole 213 and the second hole 214 directly run through the first side 211 and the second side 212, while the first recessed portion 215 is recessed towards the second side 212 but does not run through the second side 212.

Referring to FIGS. 13 to 17, in a third embodiment of the mounting bracket 2, the mounting portion 22 includes a plurality of mounting plates. The mounting plate includes a first mounting plate 24, a second mounting plate 25 and a third mounting plate 26. The third mounting plate 26 is located between the first mounting plate 24 and the second mounting plate 25, the first mounting plate 24 and the second mounting plate 25 are located at the same side of the mating portion 2 (the first mounting plate 24 and the second mounting plate 25 are bending to the left side in FIG. 16), and the third mounting plate 26 is located at another side of the mating portion 21 (the third mounting plate 26 is bending to the right side in FIG. 16). That is, at least one mounting plate is located on a side of the mating portion 21 opposite to the side where other mounting plates are located.

Of course, the mounting plates should be adapted to the mounting position of the heat exchanger integrated assembly 100. In the third embodiment, the first mounting plate 24, the second mounting plate 25 and the third mounting plate 26 are located on the same plane, or at least the planes on the first mounting plate 24, the second mounting plate 25 and the third mounting plate 26 where the mounting holes 221 are located are the same plane and the plane, where the mounting holes 221 are located, intersects on a connection portion with a plane where the mating portion 21 is located. Such arrangement not only facilitates installation, but also ensures the installation reliability of each mounting plate.

It should be noted that, the bending directions of the first mounting plate 24, the second mounting plate 25 and the third mounting plate 26 may be adjusted according to the mounting position of the heat exchanger integrated assembly 100. For example, the second mounting plate 25 and the third mounting plate 26 are bent in the same direction, while the first mounting plate 24 is bent in a direction opposite to the bending direction of the second mounting plate 25 and the third mounting plate 26. Based on the principle of triangle stability, the condition can be met as long as at least one mounting plate is located on a side of the mating portion 21 opposite to the side where other mounting plates are located. In the third embodiment, the third mounting plate 26 is bent in a direction opposite to the bending direction of the first mounting plate 24 and the second mounting plate 25, and is located at a middle of the plane where the three mounting plates are located. Thus, vertexes of the three mounting plates may form a triangle, and the mating portion 21 formed by extending from the bent position is perpendicular to the plane where the triangle is located. The first mounting plate 24 and the second mounting plate 25 are located on one side of the plane where the mating portion 21 is located, and the third mounting plate 26 is located on another side of the plane where the mating portion 21 is located. With such arrangement, the mounting portion has a high structural strength, and the stability of the mounting bracket 2 may be improved, thus the heat exchanger integrated assembly 100 can be fixed at the mounting position more stably. And, the third mounting plate 26 located at the middle further has a positioning function.

Besides, the mounting plate on the mounting portion may also be a one-way bending structure, the mounting portion includes at least two connection portions, and an interval between the at least two adjacent connection portions is greater than an interval between other adjacent bending portions. For example, the first mounting plate 24 and the second mounting plate 25 may be arranged as an integrated annular structure, or the first mounting plate 24 and the second mounting plate 25 may be arranged with an interval, and an interval space is vacated at a position of the third mounting plate 26 in the above embodiment.

In the third embodiment, to enable the heat exchanger integrated assembly 100 of the present application to have a compact structure, the plane where the first mounting plate 24, the second mounting plate 25 and the third mounting plate 26 are located is substantially perpendicular to the plane where the mating portion 21 is located. Each of the first mounting plate 24, the second mounting plate 25 and the third mounting plate 26 is provided with at least one mounting hole 221, and in the mounting directions passing through the mounting holes 221, the mounting holes 221 are totally exposed outside the heat exchanger 1 and the adaptor 3. With such arrangement, when the bolts are fitted through the mounting holes 221 to mount and fix the integrated assembly 100 of the heat exchanger and the expansion valve at the mounting position, the bolts may not bump the heat exchanger 1 and the adaptor 3.

Figure 16:
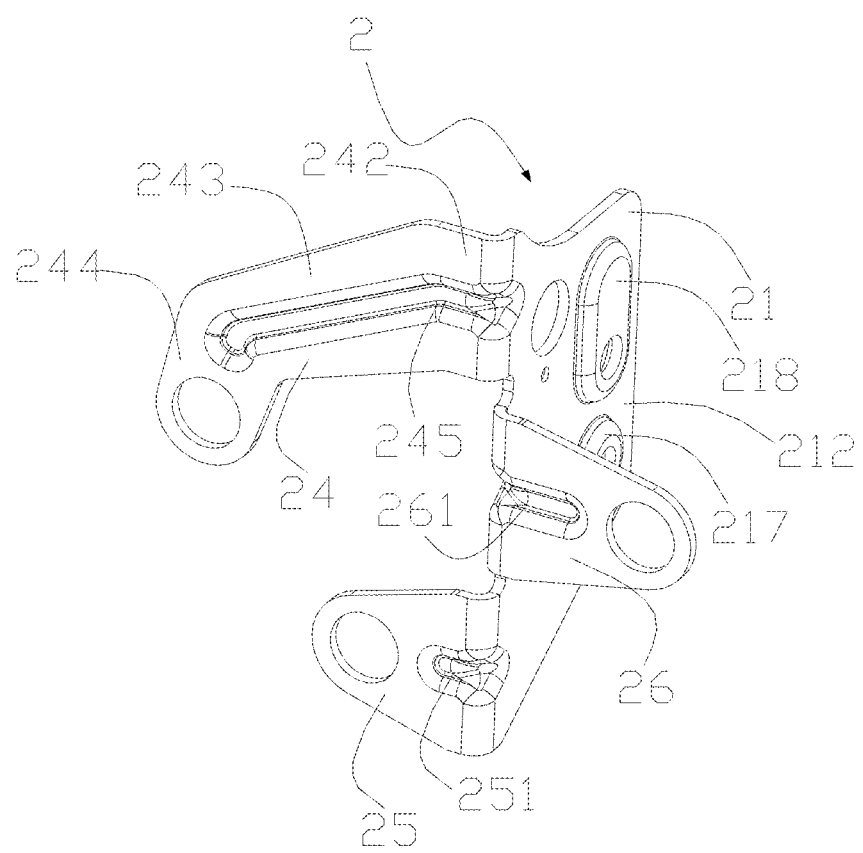
FIG. 16 is a perspective view showing a third embodiment of the mounting bracket in FIG. 14.

In the third embodiment, one plate is cut into three parts and the three parts are respectively bent to form the first mounting plate 24, the second mounting plate 25 and the third mounting plate 26 which does not interfere with each other. As shown in FIG. 16, the first mounting plate 24 includes a first extension section 242, a second extension section 243 inclined at a certain angle with respect to the first extension section 242, and a third extension section 244 inclined at a certain angle with respect to the second extension section 243, wherein the inclination direction of the second extension section 243 is same as the inclination direction of the third extension section 244, and an inclination angle of the third extension section 244 is greater than an inclination angle of the second extension section 243. Thus, the mounting hole 221 on the first mounting plate 24 is partially aligned with the mounting hole 221 on the third mounting plate 26 in a diameter direction, which is perpendicular to the bending portion of the mounting bracket 2, of the mounting hole 221 of the first mounting plate 24. And, a height of the space between the first mounting plate 24 and the bending portion is greater than a height of the third mounting plate 26.

Of course, the mounting plates on the mounting portion 22 may also be connected to the mating portion 21 by welding or other manners. The first mounting plate 24 is also not limited to the structure shown in FIG. 16, and can be any structure as long as at least a part of the mounting hole 221 on the first mounting plate 24 is aligned with the mounting hole 221 on the third mounting plate 24 in the diameter direction, perpendicular to the connection portion of the mounting bracket 2, of the mounting hole 221, for example, the first mounting plate 24 may be an arc-shaped extension section. The mounting bracket 2 in the third embodiment not only solves the problem of interference among the mounting plates, but also is easy to machine and has a low cost.

Besides, the first mounting plate 24 is further provided with a first reinforcement rib 245. The first reinforcement rib 245 extends from a connection portion where the first mounting plate 24 intersects with the mating portion 21 to an area where the corresponding mounting hole 221 is located and keeps a certain distance from the mounting hole 221, and at least a part of the first reinforcement rib 245 is located in the mating portion 21. Similarly, the second mounting plate 25 is also provided with a second reinforcement rib 251, the second reinforcement rib 251 extends from a connection portion where the second mounting plate 25 intersects with the mating portion 21 to an area where the corresponding mounting hole is located and keeps a certain distance from the mounting hole, and at least a part of the second mounting plate 25 is located in the mating portion 21. The third mounting plate 26 is also provided with a third reinforcement rib 261, the third reinforcement rib 261 extends from a connection portion where the third mounting plate 26 intersects with the mating portion 21 to an area where the corresponding mounting hole is located and keeps a certain distance from the mounting hole, and at least a part of the third reinforcement rib 261 is located in the mating portion 21. To avoid interfering with the installation of the heat exchanger 1, the first reinforcement rib 245 and the second reinforcement rib 251 located on the heat exchanger side protrude in a direction away from the heat exchanger 1, and the third reinforcement rib 261 located on the expansion valve side protrudes in a direction facing the expansion valve 4, that is, the reinforcement ribs 245, 251 and 261 protrude in the same direction. Or, the first reinforcement rib 245 and the second reinforcement rib 251 located on the heat exchanger side protrude in a direction away from the heat exchanger 1, and the third reinforcement rib 261 located on the expansion valve side protrudes in a direction away from the expansion valve 4, that is, the reinforcement ribs on the mounting plates which are bent in different directions have different protruding directions.

By providing the reinforcement ribs 245, 251 and 261, the structural strength of the mounting bracket 2 may be improved, and the reinforcement ribs are provided at the connection portion and at least a part of each reinforcement rib extends to the mating portion 21, thereby improving the strength of the bending portion and reducing the damage caused by stress in bending process.

Figure 17:
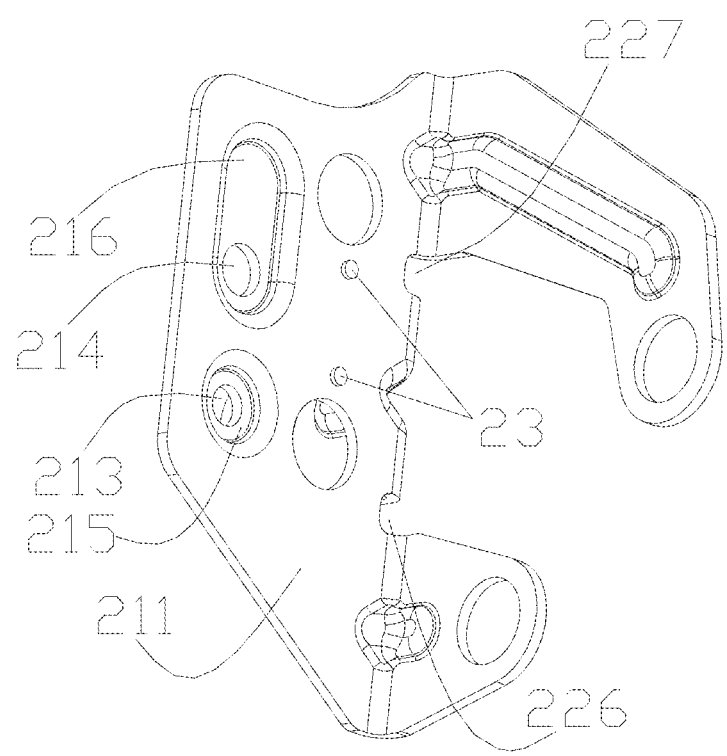
FIG. 17 is a perspective view showing the mounting bracket in FIG. 16 viewed from another angle.

Referring to FIG. 17, a first groove 226 is provided between the first mounting plate 24 and the third mounting plate 26, a second groove 227 is provided between the second mounting plate 25 and the third mounting plate 26, and the first groove 226 and the second groove 227 are recessed towards the mating portion 21. Such arrangement may facilitate the bending process of each mounting plate and avoids cracks in the bending process.

In assembling, the first pipeline 31 of the adaptor 3 is inserted into the first hole 213 to be in communication with the first inlet 11 via the first recessed portion 215. The second pipeline 32 of the adaptor 3 is inserted into the second hole 214 to be in communication with the first outlet 12. The third pipeline 33 of the adaptor 3 is inserted into the outlet 42 of the expansion valve 4. The fourth pipeline 34 of the adaptor 3 is inserted into the inlet 41 of the expansion valve 4. Referring to FIG. 4, the second pipeline 32 of the adaptor 3 passes through the second hole 214 of the second protruding portion 218 to be in communication with the first outlet 12 via the second recessed portion 216. The adaptor 3 is connected to the mounting bracket 2 and the expansion valve 4 through the first pipeline 31 and the second pipeline 32, and the third pipeline 33 and the fourth pipeline 34 respectively, thus the installation is convenient. Besides, the first protruding portion 217 and the second protruding portion 218 can have a good positioning effect. It is well known that, the inlet and the outlet of a specific expansion valve 4 for cooperating with the third pipeline 33 and the fourth pipeline 34 respectively have fixed sizes, that is, for matching with the inlet and the outlet of the expansion valve 4, the third pipeline 33 and the fourth pipeline 34 of the adaptor 3 have fixed diameters. However, in the embodiments of the present application, the size of the first pipeline 31 is designedly reduced to be smaller than the diameter of the fourth pipeline 34, and the size of the second pipeline 32 is designedly reduced to be smaller than the diameter of the third pipeline 33. Such design may have the following advantages, sizes of the first hole 213 and the second hole 214 which match with the first pipeline 31 and the second pipeline 32 respectively may be reduced correspondingly as the sizes of the first pipeline 31 and the second pipeline 32 are reduced, thus the first recessed portion 215 does not need to have a large size, which reduces the volume of the mounting bracket 2 on the whole.

Referring to FIG. 3 and FIG. 4, although a center distance M of the first inlet 11 and the first outlet 12 is greater than a center distance N of the inlet and the outlet of the expansion valve 4 (namely a center distance of the first pipeline 31 and the second pipeline 32, because the center distance N is equal to the center distance of the first pipeline 31 and the second pipeline 32), since the first recessed portion 215 has a flow passage with a certain length, with the adjustment of the first recessed portion 215, the first inlet 11 and the first outlet 12 can also cooperate with the inlet and the outlet of the expansion valve 4 even though the center distance M of the first inlet 11 and the first outlet 12 is different from the center distance of the inlet and the outlet of the expansion valve 4. The first inlet 11 and the first pipeline 31 are staggered to adjust the center distances.

It should be appreciated that, in the case that the first inlet 11 and the first outlet 12 are arranged in a form of diagonal line or other manners, the problem of the different center distances may also be solved through the arrangement of the second recessed portion 216, thereby realizing the object of matching the center distances.

Referring to FIG. 4, preferably, after the first pipeline 31 is inserted into the first hole 213, at least a part of the first pipeline 31 further extends beyond the first hole 213 to extend into the first recessed portion 215, and after the second pipeline 32 is inserted into the second hole 214, at least a part of the second pipeline 32 further extends beyond the second hole 214 to extend into the second recessed portion 216. Before being welded in a furnace, the first pipeline 31 and the second pipeline 32 are expanded by a clamp to fix the mounting bracket 2 to the adaptor 3. It should be appreciated that, after the first pipeline 31 and the second pipeline 32 are expanded, the parts of the first pipeline 31 and the second pipeline 32 which respectively extend beyond the first hole 213 and the second hole 214 may form slight outward flanges, so as to fix the mounting bracket 2 to the adaptor 3.

Preferably, referring to FIG. 3 and FIG. 4, a sealing ring 331 is sleeved on the third pipeline 33, and then the third pipeline 33 is inserted into the outlet 42 of the expansion valve 4, thereby realizing a good sealing effect. Similarly, a sealing ring 341 is sleeved on the fourth pipeline 34 of the adaptor 3, and then the fourth pipeline 34 is inserted into the inlet 41 of the expansion valve 4.

Figure 11:
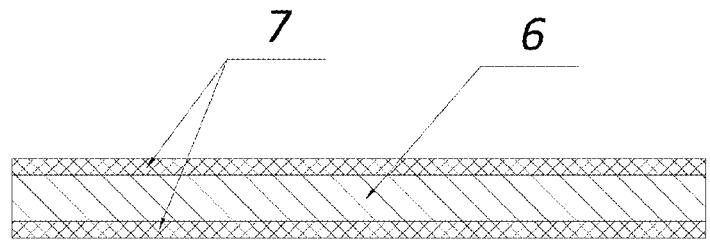
FIG. 11 is a sectional view of materials of a circulating plate, a cover plate and the mounting bracket in the heat exchanger integrated assembly.

The members of the heat exchanger 1, including the circulating plates 15, the fins, the cover plate 16, the first aluminous connecting pipe 13, the second aluminous connecting pipe 14, the mounting bracket 2 and the adaptor 3, are welded together by braze welding. Referring to FIG. 11, the circulating plates 15, the cover plate 16 and the mounting bracket 11 all adopt an aluminous composite plate, wherein a core material 6 is 3003 aluminous, a composite layer 7 is 4004 or 4045 aluminous, and the fusing point of the composite layer 7 is lower than the fusing point of the core material 6. Referring to FIG. 4, after the welding process, the periphery of the first recessed portion 215 and the periphery of the second recessed portion 216 on the first side 211 of the mating portion 21 are both welded to the heat exchanger 1 to completely separate the first recessed portion 215 from the second recessed portion 216.

The heat exchanger integrated assembly 100 according to the present application can be applied in a battery cooling system of the electric automobile, and the operation principle is described as follows. Referring to FIG. 4, a refrigerant flows into the fourth pipeline 34 of the adaptor 3 from the inlet 41 of the expansion valve 4, and flows out of the first pipeline 31 of the adaptor 3, and then flows into the first inlet 11 of the heat exchanger 1. Meanwhile, a cooling liquid flows into the heat exchanger 1 from the first aluminous connecting pipe 13. The refrigerant and the cooling liquid exchange heat in the heat exchanger 1, thus the cooling liquid is cooled, and then the cooling liquid flows out of the second aluminous connecting pipe 14 to cool the batteries through a battery cooling plate. The refrigerant flows out of the first outlet 12, passes through the second pipeline 32 and the third pipeline 33 of the adaptor 3, and finally flows out of the outlet 42 of the expansion valve 4.

Figure 12:
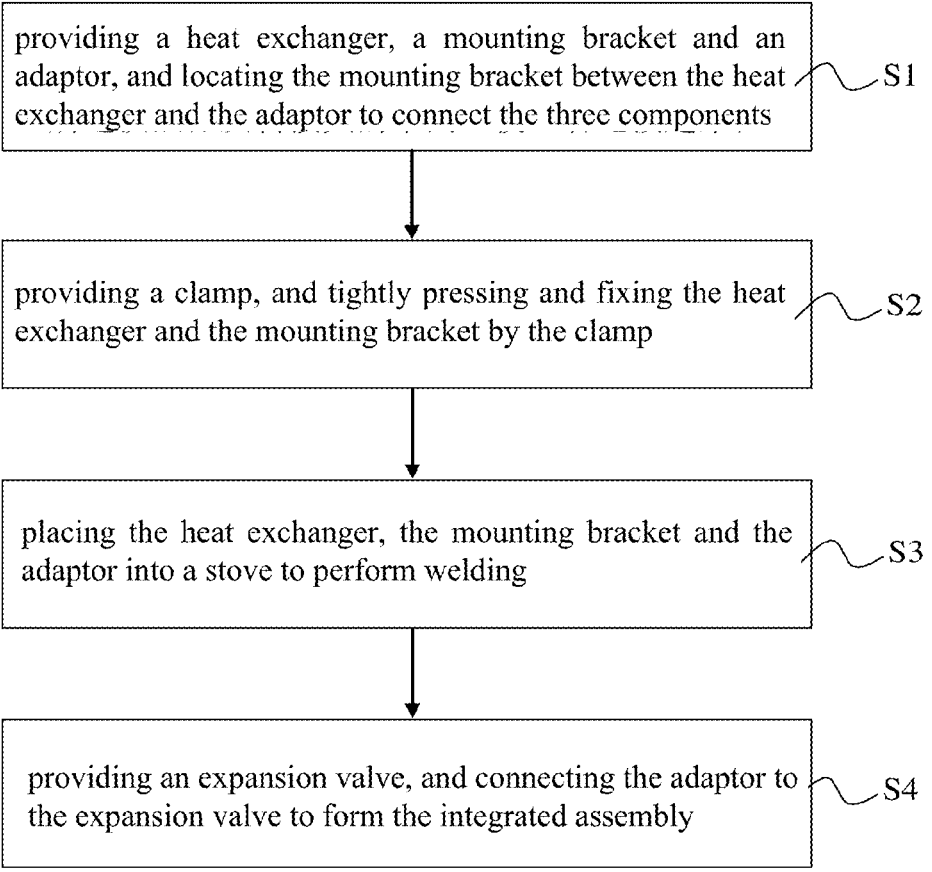
FIG. 12 is a schematic view showing the manufacturing process of the heat exchanger integrated assembly according to the present application.
Figure 13:
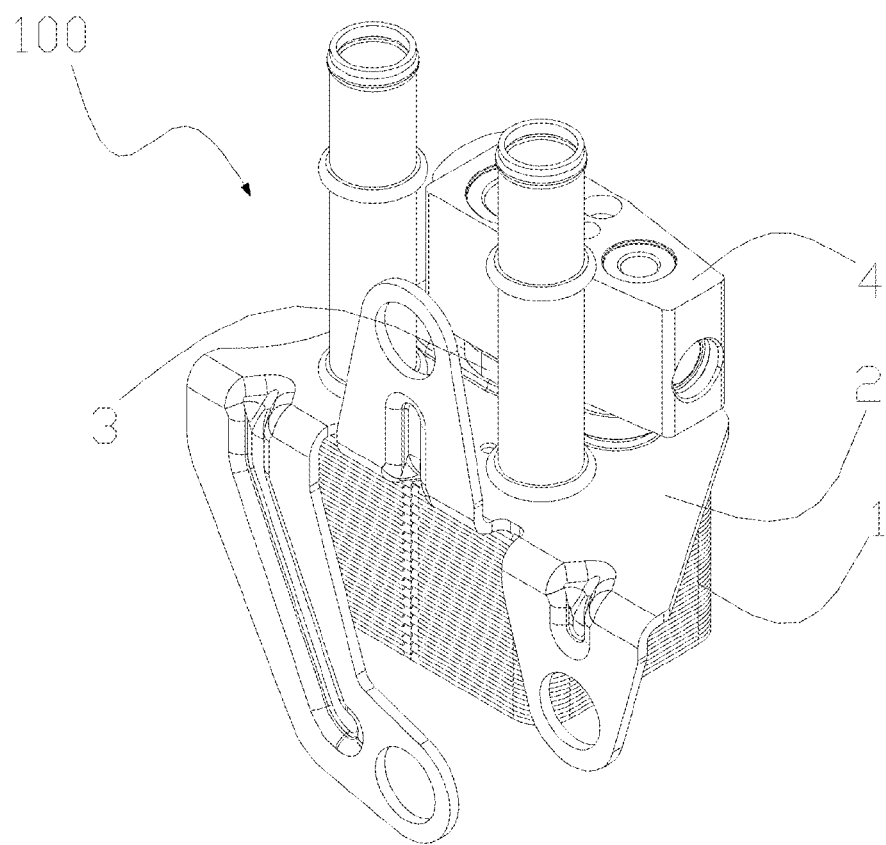
FIG. 13 is a perspective view showing the heat exchanger integrated assembly according to another embodiment of the present application.
Figure 14:
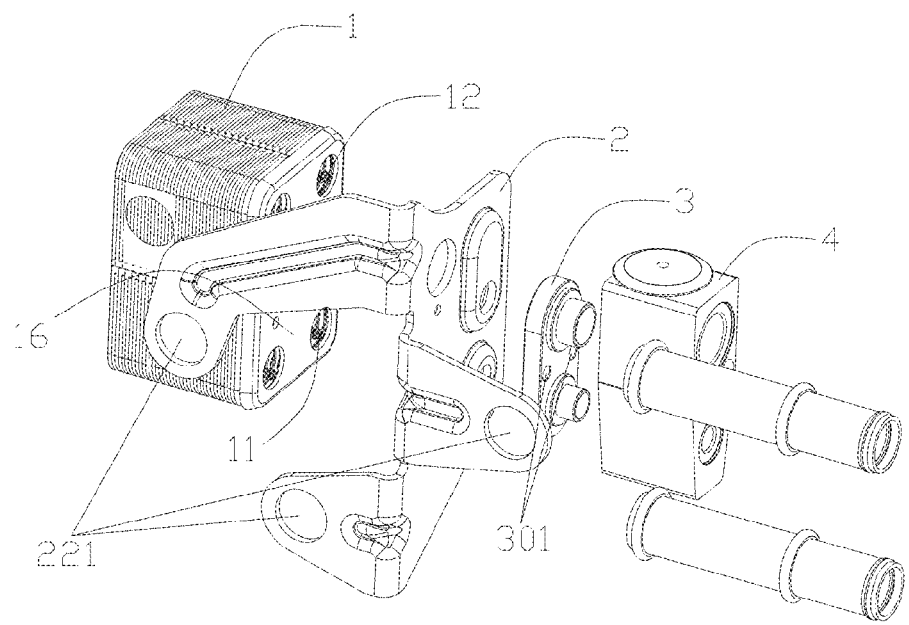
FIG. 14 is a perspective exploded view showing the heat exchanger integrated assembly in FIG. 13.
Figure 15:
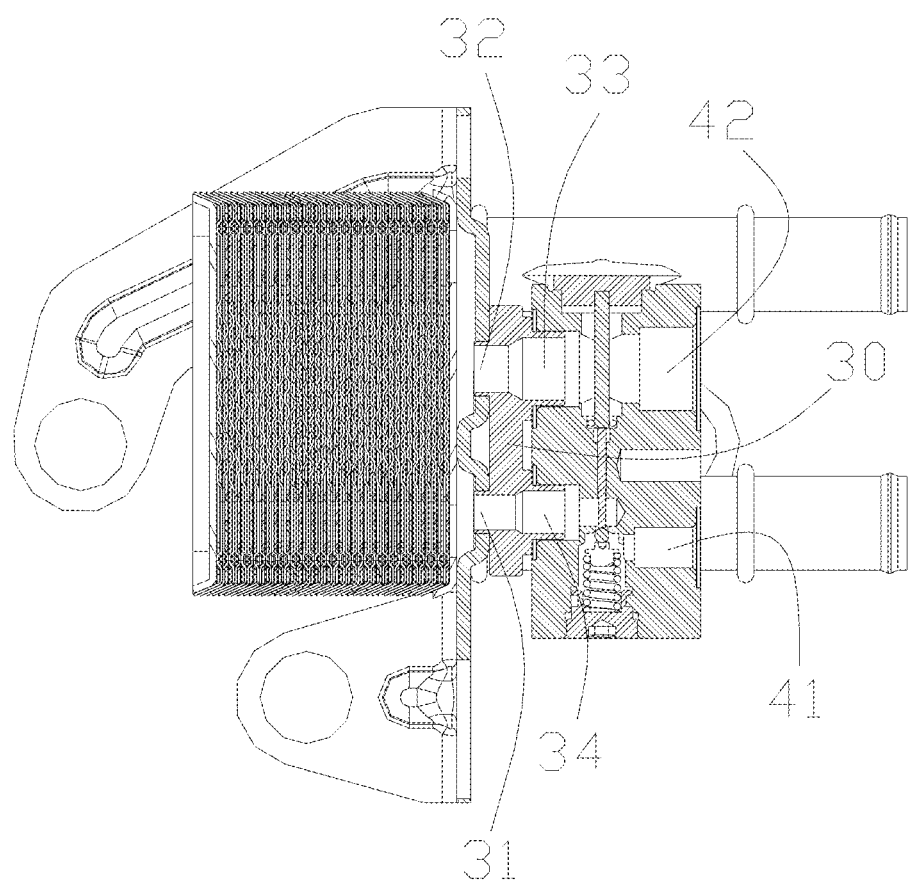
FIG. 15 is a sectional view showing the heat exchanger integrated assembly in FIG. 13.

Referring to FIG. 12, a manufacturing method of the heat exchanger integrated assembly 100 is also provided according to the present application, and the manufacturing method includes the following steps.

Step S1) may include providing a heat exchanger 1, a mounting bracket 2 and an adaptor 3, locating the mounting bracket 2 between the heat exchanger 1 and the adaptor 3, and directly assembling the three components (namely prepositioning).

Step S2) may include providing a clamp (not shown in the figures), and tightly pressing and fixing the heat exchanger 1 and the adaptor 3 by the clamp.

Step S3) may include placing the heat exchanger 1, the mounting bracket 2 and the adaptor 3 into a furnace to perform welding.

Step S4) may include providing an expansion valve 4, and connecting the adaptor 3 to the expansion valve 4 to form the heat exchanger integrated assembly 100.

Preferably, in Step S1), after the first pipeline 31 is inserted into the first hole 213, at least a part of the first pipeline 31 further extends beyond the first hole 213, and after the second pipeline 32 is inserted into the second hole 214, at least a part of the second pipeline 32 further extends beyond the second hole 214. Step S1) may further include a procedure of expanding the first pipeline 31 and the second pipeline 32, to fix the mounting bracket 2 to the adaptor 3. On this basis, since the mounting bracket 2 and the adaptor 3 are preliminarily fixed, in Step S2), it only requires to using the clamp to tightly press the heat exchanger 1 and the mounting bracket 2.

Preferably, in Step S2), the clamp is employed to clamp the heat exchanger 1 and the mating portion 21, and in Step S3), a vacuum furnace is employed to perform a vacuum brazing or a tunnel furnace is employed to perform a nitrogen protective welding. During the welding, the temperature is increased to be higher than the fusing point of the composite layer 7 and lower than the fusing point of the core material 6, at this moment, the composite layer 7 is fused while the core material 6 is not fused. Then the temperature is reduced, the circulating plates 15, the fins, the cover plate 16, the first aluminous connecting pipe 13, the second aluminous connecting pipe 14, the mounting bracket 2 and the adaptor 3 may be welded together after being cooled. After the welding process is accomplished, the sealing ring 331 and the sealing ring 341 are installed, and then the expansion valve 4 is directly sleeved on the adaptor 3. Finally, the expansion valve 4 and the adaptor 3 are fixed via two bolts 5.

Compared with the conventional technology, in the present application, the heat exchanger 1 and the expansion valve 4 are directly connected through the mounting bracket 2 and the adaptor 3, without using pipes, thus the present application has the following technical effects.

(1) The connection structure is simple, and the assembly has a small volume, thus is easy to be installed inside a vehicle.

(2) Without the pipes, the number of parts is reduced, which enables the whole assembly to have a light weight and a low cost.

(3) Without the pipes, the connecting pipeline is shortened, thus the whole assembly has a better vibration-proof performance, and raptures of the pipes are fundamentally avoided.

(4) Without the pipes, the refrigeration effect is bound to be improved.

(5) The mounting bracket 2 has a high stability and an improved vibration-proof performance.

Besides, the center distances may be adjusted through the first recessed portion 215, to allow the inlet and the outlet of the heat exchanger 1 to match with the expansion valve 4. The assembly method according to the present application may use a heat exchanger 1 with any size to be assembled with an expansion valve 4 with any size, thereby greatly improving the versatility.

It should be noted that, the above embodiments are only specific embodiments of the present application, and are not intended to limit the present application in any form. The nouns of locality in the specification, such as up, down, left and right, should not be regarded as limitation to the orientation, but are provided to facilitate describing the present application by describing according to the orientations in the figures. Although the present application is disclosed hereinabove by the preferred embodiments, the preferred embodiments are not used to limit the present application. It should be understood by the skilled in the art that, many possible variations and modifications, or equivalent embodiments modified as equivalent variations, may be made to the technical solution of the present application based on the above disclosed technical contents without departing from the scope of the technical solution of the present application. Therefore, any simple variations, equivalent variations and modifications, made to the above embodiments according to the technical essence of the present application without departing from the content of the technical solution of the present application, are also deemed to fall into the scope defined by the technical solution of the present application.

The invention claimed is:

1. A heat exchanger integrated assembly, comprising a heat exchanger, a mating portion abutting against the heat exchanger, and an adaptor fixed on the mating portion, wherein the mating portion is located between the heat exchanger and the adaptor, the heat exchanger comprises a first flow passage and a second flow passage, and the first flow passage comprises a first inlet and a first outlet; the mating portion comprises a first side facing the heat exchanger, a second side facing the adaptor, and a first hole and a second hole both running through the first side and the second side, and the first hole and the second hole of the mating portion are separated from each other, and the mating portion further comprises a first recessed portion formed on the first side and in communication with the first hole; the adaptor comprises a first passage and a second passage, the first passage is in communication with the first hole and is further in communication with the first inlet via the first recessed portion; and the second passage is in communication with the first outlet via the second hole, wherein, the heat exchanger integrated assembly comprises a mounting bracket, the mating portion is located on the mounting bracket, the mounting bracket further comprises a mounting portion, and a plane where the mounting portion is located forms an included angle with respect to a plane where the mating portion is located, and the mounting portion is provided with at least one mounting hole, and in a mounting direction passing through the mounting hole, the mounting hole is located outside the heat exchanger.

2. The heat exchanger integrated assembly according to claim 1, wherein the first passage is aligned with the first hole, the second passage is aligned with the second hole, and a center distance of the first inlet and the first outlet is greater than a center distance of the first passage and the second passage.

3. The heat exchanger integrated assembly according to claim 1, wherein the mating portion comprises a second recessed portion formed on the first side, and a first protruding portion and a second protruding portion both being formed on the second side and protruding out of the second side, the first protruding portion is corresponding to the first recessed portion, the second protruding portion is corresponding to the second recessed portion, the first hole is located in the first protruding portion, the second hole is located in the second protruding portion and in communication with the second recessed portion, and the second passage is in communication with the first outlet via the second hole and the second recessed portion; and on the first side of the mating portion, a periphery of the first recessed portion and a periphery of the second recessed portion are both brazed to the heat exchanger to form an enclosed space.

4. The heat exchanger integrated assembly according to claim 1, wherein the adaptor comprises a main body portion, a first pipeline and a second pipeline each being located at one side of the main body portion and protruding out of the main body portion, and a third pipeline and a fourth pipeline each being located at another side of the main body portion and protruding out of the main body portion, the first pipeline is in communication with the fourth pipeline via the first passage, the second pipeline is in communication with the third pipeline via the second passage, the first pipeline is inserted into the first hole, and the second pipeline is inserted into the second hole.

5. The heat exchanger integrated assembly according to claim 4, wherein a diameter of the first pipeline is smaller than a diameter of the fourth pipeline, and a diameter of the second pipeline is smaller than a diameter of the third pipeline; and the heat exchanger integrated assembly further comprises an expansion valve, the expansion valve is provided with an inlet and an outlet, the third pipeline is inserted into the outlet of the expansion valve and the fourth pipeline is inserted into the inlet of the expansion valve.

6. The heat exchanger integrated assembly according to claim 1, wherein the mounting portion comprises at least two mounting plates and these mounting plates are respectively located at two sides of the mating portion, and each mounting plate is provided with one of the mounting holes.

7. The heat exchanger integrated assembly according to claim 6, wherein the mounting plate comprises a first mounting plate, a second mounting plate and a third mounting plate, the third mounting plate is located between the first mounting plate and the second mounting plate, the first mounting plate and the second mounting plate are located at one side of the mating portion, and the third mounting plate is located on another side of the mating portion.

8. The heat exchanger integrated assembly according to claim 7, wherein the mounting plates are located in the same plane and are substantially perpendicular to a plane where the mating portion is located, and the mounting plates are formed by respectively bending a plurality of parts formed by cutting the same sheet plate.

9. The heat exchanger integrated assembly according to claim 7, wherein the first mounting plate comprises a first extension section, a second extension section inclined at an angle with respect to the first extension section, and a third extension section inclined at an angle with respect to the second extension section, an inclination angle of the third extension section is greater than an inclination angle of the second extension section, and the second extension section and the third extension section are inclined in a direction toward the second mounting plate.

10. The heat exchanger integrated assembly according to claim 7, wherein the first mounting plate, the second mounting plate and the third mounting plate are each provided with a continuous strengthening rib, and the strengthening rib has one end close to the corresponding mounting hole, and another end located at a connection portion where the mounting plate intersects with the mating portion.

11. The heat exchanger integrated assembly according to claim 7, wherein a first groove is provided between the first mounting plate and the third mounting plate, a second groove is provided between the second mounting plate and the third mounting plate, and the first groove and the second groove are recessed inwards the mating portion.

* * * * *